United States Patent
MacDonald

(10) Patent No.: US 6,716,104 B2
(45) Date of Patent: Apr. 6, 2004

(54) TUBE CLAMP ISOLATOR

(75) Inventor: Jeffrey H. MacDonald, Bantam, CT (US)

(73) Assignee: The Torrington Company, Torrington, CT (US)

(*) Notice: Subject to any disclaimer, the term of this patent is extended or adjusted under 35 U.S.C. 154(b) by 0 days.

(21) Appl. No.: 10/092,233

(22) Filed: Mar. 6, 2002

(65) Prior Publication Data

US 2003/0171151 A1 Sep. 11, 2003

(51) Int. Cl.[7] .................................................. F16D 3/76
(52) U.S. Cl. ........................ 464/89; 403/344; 403/374.3
(58) Field of Search .............................. 403/301, 305, 403/344, 373, 374.1, 374.2, 374.3; 464/89, 153; 74/492

(56) References Cited

U.S. PATENT DOCUMENTS

| 1,201,863 | A | * | 10/1916 | Orey | 403/344 |
| 1,458,894 | A | * | 6/1923 | Schwarz | 403/301 X |
| 2,638,761 | A | * | 5/1953 | Henry | 464/89 |
| 3,473,202 | A | * | 10/1969 | Howard | 403/344 |
| 3,486,396 | A | * | 12/1969 | Yoshioka et al. | 74/492 |
| 3,649,054 | A | * | 3/1972 | McClenan | 403/374.2 X |
| 5,026,199 | A | * | 6/1991 | Schmid et al. | 403/305 X |
| 5,366,413 | A | * | 11/1994 | Yamaguchi et al. | 464/89 |
| 5,579,661 | A | * | 12/1996 | Yarnell et al. | 403/305 X |
| 5,851,084 | A | * | 12/1998 | Nishikawa | 403/344 |

FOREIGN PATENT DOCUMENTS

FR            2540195      *   8/1984    ............ 403/373

* cited by examiner

Primary Examiner—Greg Binda
(74) Attorney, Agent, or Firm—Michael Best & Friedrich LLP

(57) ABSTRACT

A clamp isolator for an intermediate shaft assembly comprising an intermediate shaft having a free end and a secondary shaft having a free end. The clamp isolator includes a clamping portion and an isolation portion and interconnects the two shafts. The clamping portion is configured to rigidly clamp upon one of the shaft free ends and the isolation portion includes a substantially hollow housing configured to receive an isolation bushing therein. The isolation bushing has an opening therein configured to receive the other of the shaft free ends.

7 Claims, 2 Drawing Sheets

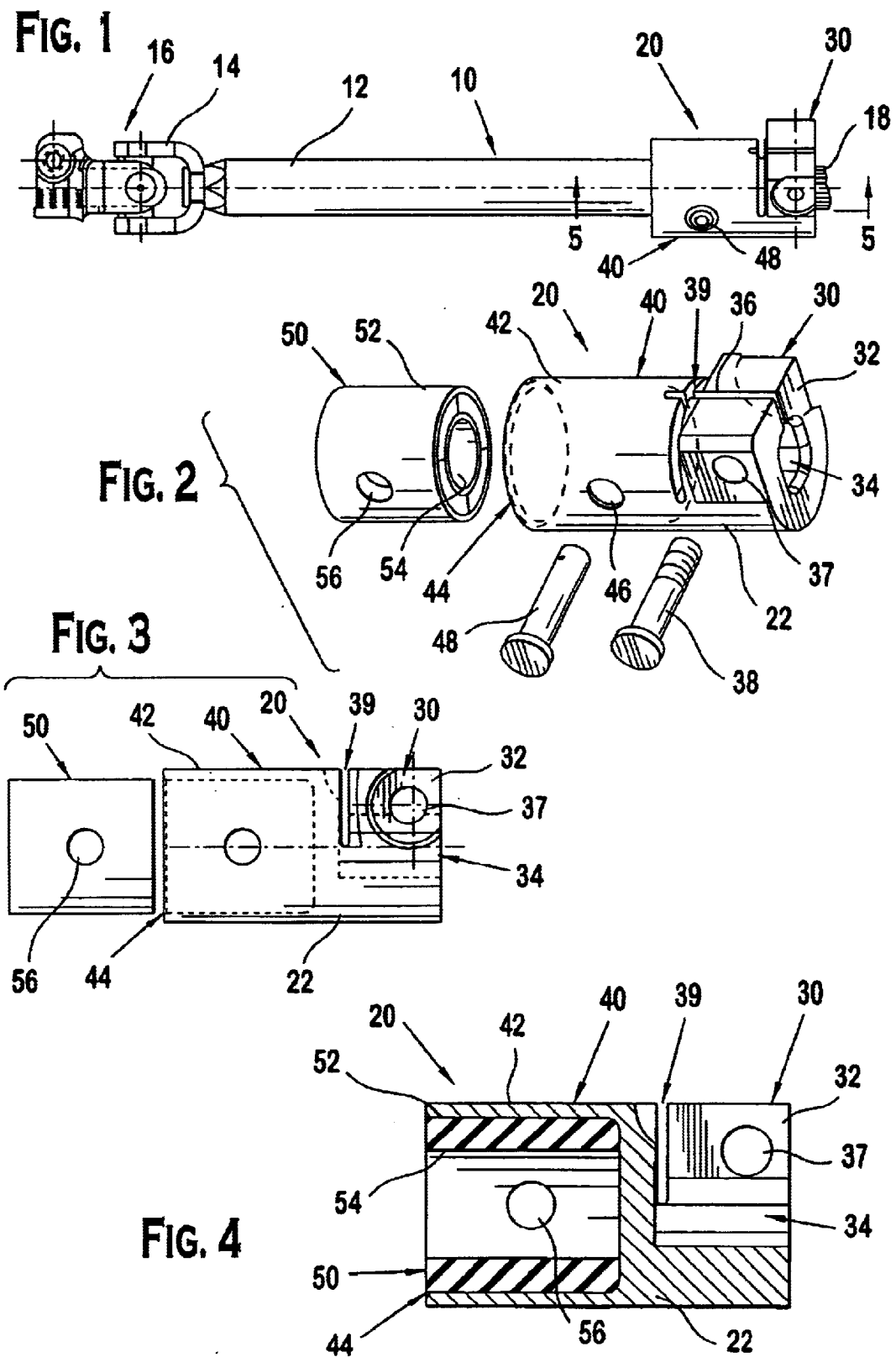

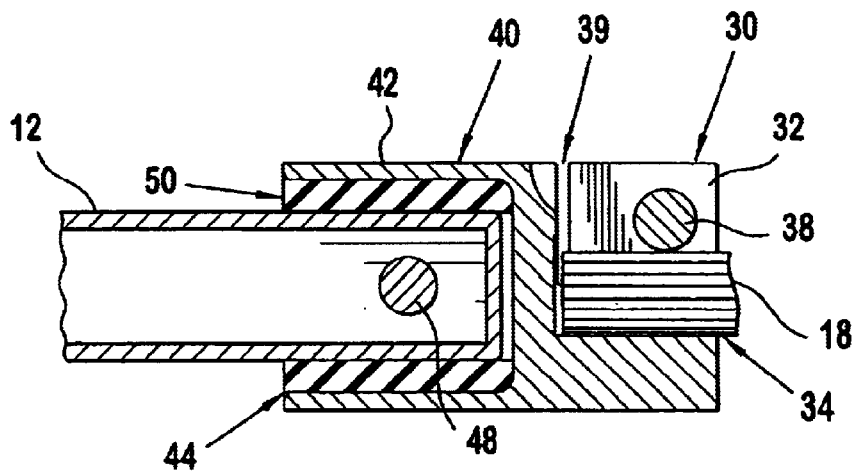
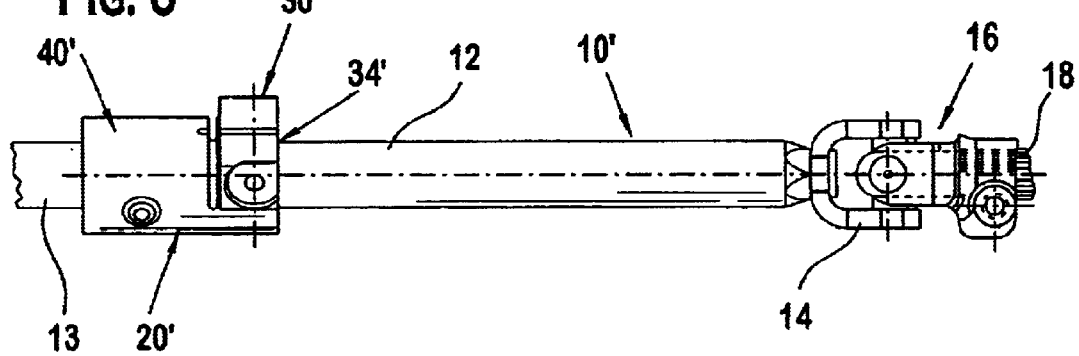
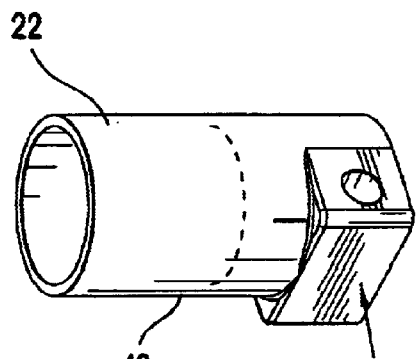
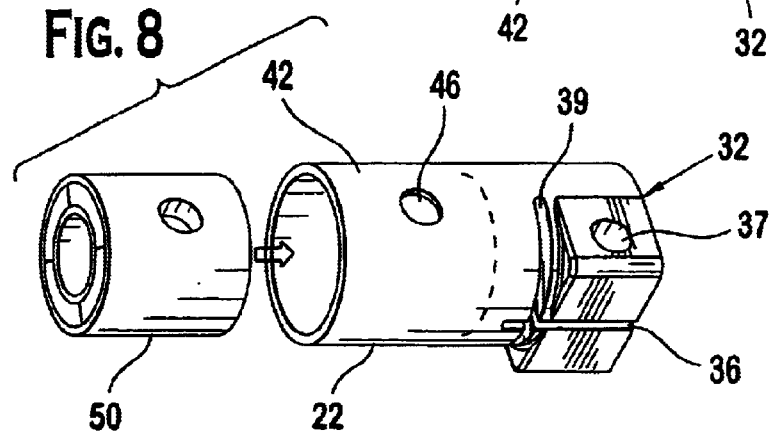

TUBE CLAMP ISOLATOR

BACKGROUND

The present invention relates to steering columns. More particularly, the present invention relates to an intermediate shaft assembly including an isolation bushing.

A steering intermediate shaft is often utilized to connect a gear input shaft to an upper shaft, for example, either an upper intermediate shaft or directly to the steering column shaft. The upper shaft and the intermediate shaft typically each include a yoke at one end, the yokes being interconnected to provide a universal joint. The opposite end of the intermediate shaft is generally fairly rigidly interconnected with the gear input shaft. As such, any noise or other vibration between the intermediate shaft and the gear input shaft carries up the steering column. Some prior art devices have utilized a damping isolation feature proximate the universal joint, however, such feature does not always provide sufficient damping and also is limited in its flexibility since it is limited to the position of the universal joint.

SUMMARY

The present invention provides a clamp isolator for an intermediate shaft assembly. The assembly comprises an intermediate shaft having a free end and a secondary shaft having a free end. The clamp isolator interconnects the two shafts. The isolator includes a clamping portion and an isolation portion. The clamping portion is configured to rigidly clamp upon the free end of one of the shafts. The isolation portion includes a substantially hollow housing configured to receive an isolation bushing therein. The isolation bushing has an opening therein configured to receive the free end of the other shaft. A pin or the like secures the shaft free end within the bushing within the isolation housing.

BRIEF DESCRIPTION OF THE DRAWINGS

FIG. 1 is a plan view of an intermediate shaft assembly incorporating a clamp isolator according to a first embodiment of the present invention.

FIG. 2 is an exploded oblique view of the clamp isolator of FIG. 1.

FIG. 3 is an exploded elevational view of the clamp isolator of FIG. 1.

FIG. 4 is a cross-sectional elevational view of the clamp isolator of FIG. 1.

FIG. 5 is a cross-sectional view along the line 5—5 in FIG. 1.

FIG. 6 is a plan view of an alternative intermediate shaft assembly incorporating a clamp isolator according to a second embodiment of the present invention.

FIG. 7 is an oblique view of an isolator body blank.

FIG. 8 is an oblique view of a machined isolator body.

DETAILED DESCRIPTION OF THE PREFERRED EMBODIMENTS

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Referring to FIG. 1, an intermediate shaft assembly 10 incorporating a clamp isolator 20 in accordance with a first embodiment of the present invention is shown. The shaft assembly 10 generally includes a shaft 12 terminating at one end with a yoke 14 which is part of a universal joint 16. The opposite end of the shaft 12 is connected to a first end of the clamp isolator 20 via a pin 48 or the like. The opposite end of the clamp isolator 20 is clamped to a gear input shaft 18.

The preferred clamp isolator 20 is shown in FIGS. 2–4. The clamp isolator 20 includes a unitary body 22 defining a clamp portion 30 and an isolator portion 40. The clamp portion 30 includes a clamp block 32 surrounding a shaft receiving bore 34. The bore 34 is configured to correspond to the configuration of the shaft 18 to be secured therein. The clamp block 32 has a compression slot 36 extending through the upper surface of the block 32 to the receiving bore 34. A bolt 38 or the like is inserted into and tightened within a bolt bore 37 to narrow the compression slot 36 to tighten the clamp block 32 about a gear shaft 18 (see FIG. 1) or other shaft positioned in the shaft receiving bore 34. A cross slot 39 extends partially through the isolator body 22 between the clamp portion 30 and the isolator portion 40 such that the isolator portion 40 does not interfere with opening and closing of the clamp block 32.

The isolator portion 40 preferably includes a substantially hollow tube 42 extending opposite the clamp portion 30 with an open end 44 for receiving an isolation bushing 50 and the shaft 12. The tube 42 has a pin receiving bore 46 therethrough for receiving a shaft securing pin 48 or the like. The tube 42 is shown having a cylindrical configuration, but other configurations may also be utilized. Additionally, while the tube 42 is shown having a generally continuous surface, other configurations may also be utilized.

The isolation bushing 50 is preferably manufactured from rubber or some other at least partially elastomeric material. For example, a suitable bushing may be complete rubber, for example, Torrington Co. part no. 42FP024618 manufactured by BRC Rubber of Fort Wayne, Ind. or the bushing may have rubber or the like positioned between metallic sleeves, for example, Torrington Co. part no. 42FP024315 manufactured by Barry Controls of Brighton, Mass. While rubber is preferred, other materials may also be used. The bushing 50 preferably has an outer configuration 52 substantially the same as the inside configuration of the tube 52 and an inner opening 54 having a configuration substantially the same as the configuration of the shaft 12 to be received therein. The bushing 50 has a through bore 56 that aligns with the tube pin receiving bore 46 to allow passage of the shaft securing pin 48.

Referring to FIG. 5, interconnection of a gear input shaft 18 and intermediate shaft 12 utilizing clamp isolator 20 is shown. The isolation bushing 50 is positioned in the hollow tube 42. The free end of the intermediate shaft 12 is positioned within the bushing 50 and a securing pin 48 or the like is inserted to secure the shaft 12 within the tube 42. The gear input shaft 18 is inserted into the shaft receiving bore 34 and the bolt 38 is tightened to narrow the slot 36. The clamp block 32 thereby clamps about the gear input shaft 18. The clamp isolator 20 provides a secure connection between the shafts 12 and 18 while the bushing 50 provides noise, vibration and harshness damping.

Referring to FIG. 6, an alternative intermediate shaft assembly 10' is shown. The assembly 10' includes a shaft 12 terminating at one end with a yoke 14 which is part of a universal joint 16 that connects to the gear input shaft 18. The opposite end is connected to a first end of clamp isolator 20'. The clamp isolator 20' is substantially the same as the clamp isolator 20 described above except that the clamp portion 30' shaft receiving bore 34' is configured to receive the intermediate shaft 12, as opposed to a gear input shaft. The isolation portion 40' receives and secures the upper shaft 13, whether an upper intermediate shaft, column shaft or otherwise. Alternatively, the clamp isolator 20' can be reversed such that the clamp portion 30' is clamped to the upper shaft 13 and the isolation portion 40' receives the intermediate shaft 12.

Referring to FIGS. 7 and 8, a preferred method of forming the tube clamp isolator 20 will be described. The unitary isolator body 22 is preferably cast from a light weight material, for example, aluminum. The isolator body 22 is cast with the tube 42 hollowed and the shaft receiving bore 34 positioned and configured as desired. The compression slot 36 and the cross slot 39 are cut or otherwise machined into the body 22. The bolt receiving bore 37 and the pin receiving bore 46 are machined. The bushing 50 is inserted into the hollow tube 42 and the isolator 20 is ready for use.

What is claimed is:

1. A clamp isolator for interconnecting two shafts, the isolator comprising:
    a unitary body, the body including:
        a clamping portion adapted to rigidly clamp upon a free end of a first shaft;
        an isolation portion including a substantially hollow housing configured to receive an isolation bushing therein, the isolation bushing having an opening therein adapted to receive a free end of a second shaft; and
        means for securing the received shaft free end within the bushing within the isolation housing wherein a cross slot in the body separates a portion of the clamping portion and a portion of the isolation portion.

2. A clamp isolator for interconnecting two shafts, the isolator comprising:
    a unitary body, the body including:
        a clamping portion adapted to rigidly clamp upon a free end of a first shaft;
        an isolation portion including a substantially hollow housing configured to receive an isolation bushing therein, the isolation bushing having an opening therein adapted to receive a free end of a second shaft; and
        means for securing the received shaft free end within the bushing within the isolation housing
    wherein the clamping portion includes a clamping block surrounding a shaft receiving bore, the clamping block including a compression slot and means to compress the compression slot to clamp upon the shaft free end.

3. The isolator of claim 2 wherein the shaft receiving bore is configured to receive and secure a gear input shaft.

4. A clamp isolator for interconnecting two shafts, the isolator comprising:
    a unitary body, the body including:
        a clamping portion adapted to rigidly clamp upon a free end of a first shaft;
        an isolation portion including a substantially hollow housing configured to receive an isolation bushing therein, the isolation bushing having an opening therein adapted to receive a free end of a second shaft; and
        means for securing the received shaft free end within the bushing within the isolation housing wherein a cross slot in the body separates a portion of the clamping portion and a portion of the isolation portion.

5. The isolator of claim 4 wherein the bushing is manufactured from an elastomeric material.

6. The isolator of claim 4 wherein the bushing is manufactured from rubber.

7. The isolator of claim 4 wherein the means for securing the received shaft free end within the bushing within the housing includes a pin passed through and secured in a through bore extending through the housing, bushing and received shaft free end.

* * * * *

UNITED STATES PATENT AND TRADEMARK OFFICE
CERTIFICATE OF CORRECTION

PATENT NO.     : 6,716,104 B2
DATED          : April 6, 2004
INVENTOR(S)    : Jeffrey H. MacDonald It is certified that error appears in the above-identified patent and that said Letters Patent is hereby corrected as shown below:

<u>Column 4,</u>
Line 29, insert the following after "portion": -- and the clamping portion includes a clamping block surrounding a shaft receiving bore, the clamping block including a compression slot and means to compress the compression slot to clamp upon the shaft free end --

Signed and Sealed this

Twenty-fifth Day of May, 2004

JON W. DUDAS
*Acting Director of the United States Patent and Trademark Office*